United States Patent
Kim (10) Patent No.: US 9,371,061 B2
(45) Date of Patent: Jun. 21, 2016

(54) REGENERATIVE BRAKE APPARATUS OF HYBRID VEHICLE AND METHOD THEREOF

(71) Applicant: Hyundai Motor Company, Seoul (KR)

(72) Inventor: Sangjoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/551,021

(22) Filed: Nov. 23, 2014

(65) Prior Publication Data
US 2016/0059705 A1  Mar. 3, 2016

(30) Foreign Application Priority Data
Aug. 27, 2014  (KR) .................. 10-2014-0112631

(51) Int. Cl.
| | |
|---|---|
| *B60W 10/04* | (2006.01) |
| *B60T 7/18* | (2006.01) |
| *B60T 8/17* | (2006.01) |
| *B60L 7/26* | (2006.01) |
| *B60L 11/14* | (2006.01) |
| *B60L 15/20* | (2006.01) |
| *B60T 1/10* | (2006.01) |

(52) U.S. Cl.
CPC ... *B60T 7/18* (2013.01); *B60L 7/26* (2013.01); *B60L 11/14* (2013.01); *B60L 15/2009* (2013.01); *B60L 15/2054* (2013.01); *B60T 1/10* (2013.01); *B60T 8/17* (2013.01); *B60T 8/1701* (2013.01); *B60L 2240/423* (2013.01); *B60T 2270/604* (2013.01); *Y10S 903/947* (2013.01)

(58) Field of Classification Search
USPC .............................. 701/70, 93, 96
See application file for complete search history.

(56) References Cited

U.S. PATENT DOCUMENTS

| | | | | |
|---|---|---|---|---|
| 5,984,034 | A * | 11/1999 | Morisawa ................. | B60K 6/48 180/65.28 |
| 7,703,563 | B2 * | 4/2010 | Aldrich, III ............ | B60K 6/485 180/65.21 |
| 8,265,850 | B2 * | 9/2012 | Shin ...................... | B60W 10/06 701/93 |
| 8,543,273 | B2 * | 9/2013 | Pfefferl .................... | B60T 1/10 180/65.265 |
| 2005/0240333 | A1 * | 10/2005 | Bauerle ................. | F02D 41/021 701/93 |
| 2005/0264102 | A1 * | 12/2005 | Tezuka ................. | B60K 7/0007 303/152 |
| 2006/0289210 | A1 * | 12/2006 | Yoshimi ................... | B60K 6/26 180/65.245 |
| 2007/0222287 | A1 * | 9/2007 | Crombez ................. | B60L 7/18 303/151 |

(Continued)

FOREIGN PATENT DOCUMENTS

| | | |
|---|---|---|
| JP | 2012-076740 A | 4/2012 |
| KR | 10-2014-0053701 A | 5/2014 |

*Primary Examiner* — Thomas Tarcza
*Assistant Examiner* — Richard Goldman
(74) *Attorney, Agent, or Firm* — Mintz Levin Cohn Ferris Glovsky and Popeo, P.C.; Peter F. Corless (57) ABSTRACT

A regenerative braking apparatus of a vehicle includes: an engine that supplies power to front wheels of the vehicle; a hybrid starting generator (HSG) that starts the engine; an engine clutch that is disposed between the engine and a transmission and selectively transmits power from the engine to the front wheels; a motor that supplies power to the rear wheels of the vehicle; a battery that stores electrical energy generated by the HSG and the motor; and a controller that generates friction braking torque on the front wheels when necessary braking torque of the front wheels is larger than regenerative braking torque of the front wheels, and that generates friction braking torque on the rear wheels when necessary braking torque of the rear wheels is larger than regenerative braking torque of the rear wheels, in braking of the vehicle.

14 Claims, 5 Drawing Sheets

(56) References Cited

U.S. PATENT DOCUMENTS

| | | | | |
|---|---|---|---|---|
| 2007/0228822 A1* | 10/2007 | Hirata | B60K 6/48 | 303/151 |
| 2008/0255746 A1* | 10/2008 | Hellmann | B60K 26/021 | 701/96 |
| 2010/0160111 A1* | 6/2010 | Yamanaka | F16H 61/66272 | 477/45 |
| 2010/0198450 A1* | 8/2010 | Shin | B60W 30/16 | 701/31.4 |
| 2010/0198478 A1* | 8/2010 | Shin | B60W 10/06 | 701/96 |
| 2010/0250088 A1* | 9/2010 | Grolle | B60W 10/06 | 701/96 |
| 2011/0093177 A1* | 4/2011 | Horn | B60W 30/16 | 701/70 |
| 2012/0150411 A1* | 6/2012 | Oosawa | B60W 31/0008 | 701/96 |
| 2012/0234133 A1* | 9/2012 | Ikegami | B60K 6/48 | 74/661 |
| 2012/0265382 A1* | 10/2012 | Nefcy | B60W 10/06 | 701/22 |
| 2012/0310501 A1* | 12/2012 | DeWitt | B60T 1/10 | 701/70 |
| 2013/0090822 A1* | 4/2013 | Schwindt | B60K 31/0008 | 701/70 |
| 2013/0193918 A1* | 8/2013 | Sarkar | B60L 3/04 | 320/109 |
| 2013/0204472 A1* | 8/2013 | Pfefferl | B60T 1/10 | 701/22 |
| 2013/0289874 A1* | 10/2013 | Taguchi | B60W 30/146 | 701/533 |
| 2013/0304344 A1* | 11/2013 | Abe | B60L 7/18 | 701/70 |
| 2013/0328386 A1* | 12/2013 | Strengert | B60T 13/586 | 303/3 |
| 2014/0067225 A1* | 3/2014 | Lee | B60W 50/0097 | 701/93 |
| 2014/0183933 A1* | 7/2014 | Kuhlman | B60T 1/10 | 303/3 |
| 2014/0277989 A1* | 9/2014 | Krueger | B60W 10/184 | 701/96 |
| 2014/0297077 A1* | 10/2014 | Kishida | B60W 10/06 | 701/22 |
| 2015/0066269 A1* | 3/2015 | Niimi | B60L 1/003 | 701/22 |
| 2015/0120159 A1* | 4/2015 | O'Leary | B60T 7/04 | 701/70 |
| 2015/0183433 A1* | 7/2015 | Suzuki | B60W 30/16 | 701/96 |
| 2015/0197247 A1* | 7/2015 | Ichinokawa | B60W 30/143 | 701/93 |
| 2015/0239350 A1* | 8/2015 | Maucher | B60T 1/10 | 701/70 |
| 2015/0251657 A1* | 9/2015 | Johri | B60L 7/10 | 701/22 |
| 2015/0274159 A1* | 10/2015 | Lu | B60T 8/171 | 701/82 |
| 2015/0307099 A1* | 10/2015 | Dextreit | B60W 50/085 | 701/22 |
| 2015/0314771 A1* | 11/2015 | Dextreit | B60W 50/082 | 701/22 |

* cited by examiner

REGENERATIVE BRAKE APPARATUS OF HYBRID VEHICLE AND METHOD THEREOF

CROSS-REFERENCE TO RELATED APPLICATION

This application claims under 35 U.S.C. §119(a) priority to and the benefit of Korean Patent Application No. 10-2014-0112631 filed in the Korean Intellectual Property Office on Aug. 27, 2014, the entire contents of which are incorporated herein by reference.

BACKGROUND (a) Field of the Invention

The present invention relates to a regenerative braking apparatus of a hybrid vehicle, more particularly, to a regenerative brake apparatus which secures a stable braking force in a four-wheel drive vehicle and a regenerative braking method.

(b) Description of the Related Art

A hybrid vehicle uses two or more power sources, generally, an engine and a motor. The motor in a hybrid vehicle assists power from the engine in accelerating or uphill driving. In particular, the motor operates as a power generator, and when the vehicle brakes, it generates a braking force by converting kinetic energy generated during braking into electrical energy. The converted electrical energy is stored in the vehicle.

A system that converts kinetic energy generated during braking of a vehicle into electric energy and recovers the electric energy is called a regenerative braking system.

A rear-axle mounted electric device (RMED) type of hybrid vehicle will now be described. In the RMED type of hybrid vehicle, the front wheels are driven by the power from the engine, and the rear wheels are driven by power of the motor. The motor assists the power from the engine and operates as a power generator during braking of the vehicle. The engine is equipped with a hybrid starting generator (HSG), and the HSG operates as a power generator when the engine is in operation.

However, an appropriate regenerative braking plan using the motor and the HSG is required when braking the RMED type of hybrid vehicle.

The above information disclosed in this Background section is only for enhancement of understanding of the background of the invention and therefore it may contain information that does not form the prior art that is already known in this country to a person of ordinary skill in the art.

SUMMARY

The present invention provides a regenerative braking plan using an HSG and a motor, when braking an RMED type of hybrid vehicle. As provided herein, the term "vehicle" includes a "hybrid vehicle," but is not limited thereto.

An exemplary embodiment of the present invention provides a regenerative braking apparatus of a vehicle that includes: an engine that supplies power to front wheels of the vehicle; a hybrid starting generator (HSG) that starts the engine and generates electrical energy by operating as a power generator with the engine in operation; an engine clutch that is disposed between the engine and a transmission and selectively transmits the power from the engine to the front wheels; a motor that supplies power to rear wheels of the vehicle and generates electrical energy by operating as a power generator during braking; a battery that stores the electrical energy generated by the HSG and the motor; and a controller that causes friction braking torque to be generated at the front wheels when necessary braking torque at the front wheels is larger than regenerative braking torque at the front wheels, and that causes friction braking torque to be generated at the rear wheels when necessary braking torque at the rear wheels is larger than regenerative braking torque at the rear wheels, during braking of a vehicle.

The regenerative braking torque at the front wheels may be set to the smaller one of values obtained by subtracting a value which is obtained by multiplying friction torque of the engine by a current gear ratio of the transmission from the necessary braking torque at the front wheels, and the regenerative braking torque available at the front wheels.

The regenerative braking torque available at the front wheels may be set to the smaller one of first regenerative braking torque available through the battery and first regenerative braking torque available through the HSG.

The first regenerative braking torque available through the battery may be calculated from an equation: ((chargeable power of battery+power consumed by auxiliary load—charging power of motor)/charging efficiency of battery)/speed of front wheel.

The first regenerative braking torque available through the HSG may be calculated by obtaining speed and torque at the front wheels from a speed-torque curve of the HSG corresponding to gears of the transmission and then multiplying the torque at the front wheels by a state variable.

The regenerative braking torque at the rear wheels may be set to the smaller one of second regenerative braking torque available through the battery and second regenerative braking torque available through the motor.

The second regenerative braking torque available through the battery may be calculated from an equation: ((chargeable power of battery+power consumed by auxiliary load)/charging efficiency of battery)/speed of rear wheel.

The second regenerative braking torque available through the motor may be calculated by obtaining speed and torque at the rear wheels from a speed-torque curve of the motor and then multiplying the torque at the rear wheels by a state variable.

The controller may disengage the engine clutch when an engine speed is lower than a predetermined speed.

Another exemplary embodiment of the present invention provides a regenerative braking method of a vehicle, that includes: calculating necessary braking torque of front wheels and necessary braking torque of rear wheels from total necessary braking torque determined in response to a braking signal of the vehicle; calculating regenerative braking torque at the front wheels and regenerative braking torque at the rear wheels; generating friction braking torque at the front wheels when the necessary braking torque at the front wheels is larger than the regenerative braking torque at the front wheels; and generating friction braking torque at the rear wheels when the necessary braking torque at the rear wheels is larger than the regenerative braking torque at the rear wheels.

The calculating of regenerative braking torque at the front wheels may include: determining whether an engine clutch has been engaged; comparing the necessary braking torque at the front wheels with friction torque of an engine; determining whether a speed of the engine is higher than a predetermined speed; and calculating the regenerative braking torque at the front wheels when the engine clutch is engaged, the necessary braking torque at the front wheels is over the friction torque of the engine, and the speed of the engine is over the predetermined speed.

The regenerative braking torque at the front wheels may be set to the smaller one of values obtained by subtracting the friction torque of the engine from the necessary braking torque and the regenerative braking torque at the front wheels.

The regenerative braking torque available at the front wheels may be set to the smaller one of first regenerative braking torque available through the battery and first regenerative braking torque available through the HSG.

The first regenerative braking torque available through the battery may be calculated from an equation: ((chargeable power of battery+power consumed by auxiliary load—charging power of motor))/charging efficiency of battery/speed of front wheel.

The first regenerative braking torque available through the HSG may be calculated by obtaining torque at the front wheels corresponding to the speed of the front wheels from a speed-torque curve of the HSG corresponding to gears of a transmission and then multiplying the torque at the front wheels by a state variable.

The regenerative braking torque at the rear wheels may be set to the smaller one of second regenerative braking torque available through the battery and second regenerative braking torque available through the motor.

The second regenerative braking torque available through the battery may be calculated from an equation: ((chargeable power of battery+power consumed by auxiliary load)/charging efficiency of battery)/speed of rear wheel.

The second regenerative braking torque available through the motor may be calculated by obtaining speed and torque at the rear wheels from a speed-torque curve of the motor and then multiplying the torque at the rear wheels by a state variable.

According to the regenerative braking apparatus of a hybrid vehicle of an exemplary embodiment of the present invention, it is possible to secure stability during braking of a vehicle by providing a regenerative braking plan using the HSG and the motor.

Further, it is possible to maximize the regenerative braking amount of the HSG and the motor by making a plan of regenerative braking of a hybrid vehicle in consideration of the states of the motor and electric devices.

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The parts not related to the description of the exemplary embodiments are not shown to make the description clear, and like reference numerals designate like elements throughout the specification.

The sizes and thicknesses of the configurations shown in the drawings are provided selectively for the convenience of description, such that the present invention is not limited to those shown in the drawings, and the thicknesses are exaggerated to make some parts and regions more clear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
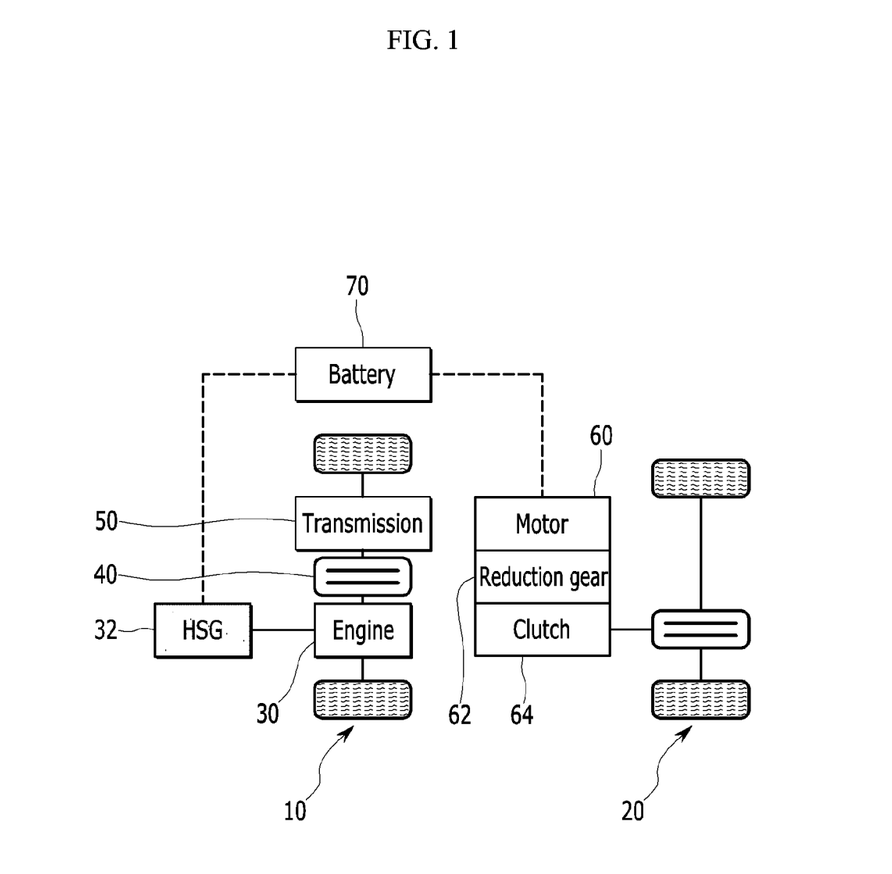
FIG. 1 is a conceptual diagram showing the configuration of a regenerative braking apparatus of a hybrid vehicle according to an exemplary embodiment of the present invention.

FIG. 1 is a conceptual diagram showing the configuration of a regenerative braking apparatus of a hybrid vehicle according to an exemplary embodiment of the present invention.

As shown in FIG. 1, the regenerative braking apparatus includes: an engine 30 that supplies power to front wheels 10 of a vehicle (e.g., a hybrid vehicle); a hybrid starting generator (HSG) 32 that starts the engine and generates electrical energy by operating as a power generator with the engine in operation; an engine clutch 40 that is disposed between the engine 30 and a transmission 50 and that selectively transmits the power from the engine 30 to the front wheels 10; a motor 60 that supplies power to rear wheels 20 of the vehicle and generates electrical energy by operating as a power generator during braking; a battery 70 that stores the electrical energy generated by the HSG and the motor; and a controller that controls these components.

The HSG (hybrid starting generator) operates as a starter and a power generator. In particular, the HSG starts the engine in response to a control signal from the controller, and generates electrical energy by operating as a power generator with the engine in operation. The electrical energy generated by the HSG is stored in the battery.

The motor assists the power from the engine when the hybrid vehicle is in operation. For example, the motor improves running performance by assisting the power from the engine when the vehicle rapidly accelerates or runs on an uphill slope.

Further, the motor generates a braking force by converting kinetic energy of the hybrid vehicle into electrical energy by operating as a power generator during braking of the vehicle. The electrical energy converted by the motor is stored in the battery.

A regenerative braking plan using the regenerative braking apparatus of a hybrid vehicle according to an exemplary embodiment of the present invention is described in detail hereafter.

Figure 2:
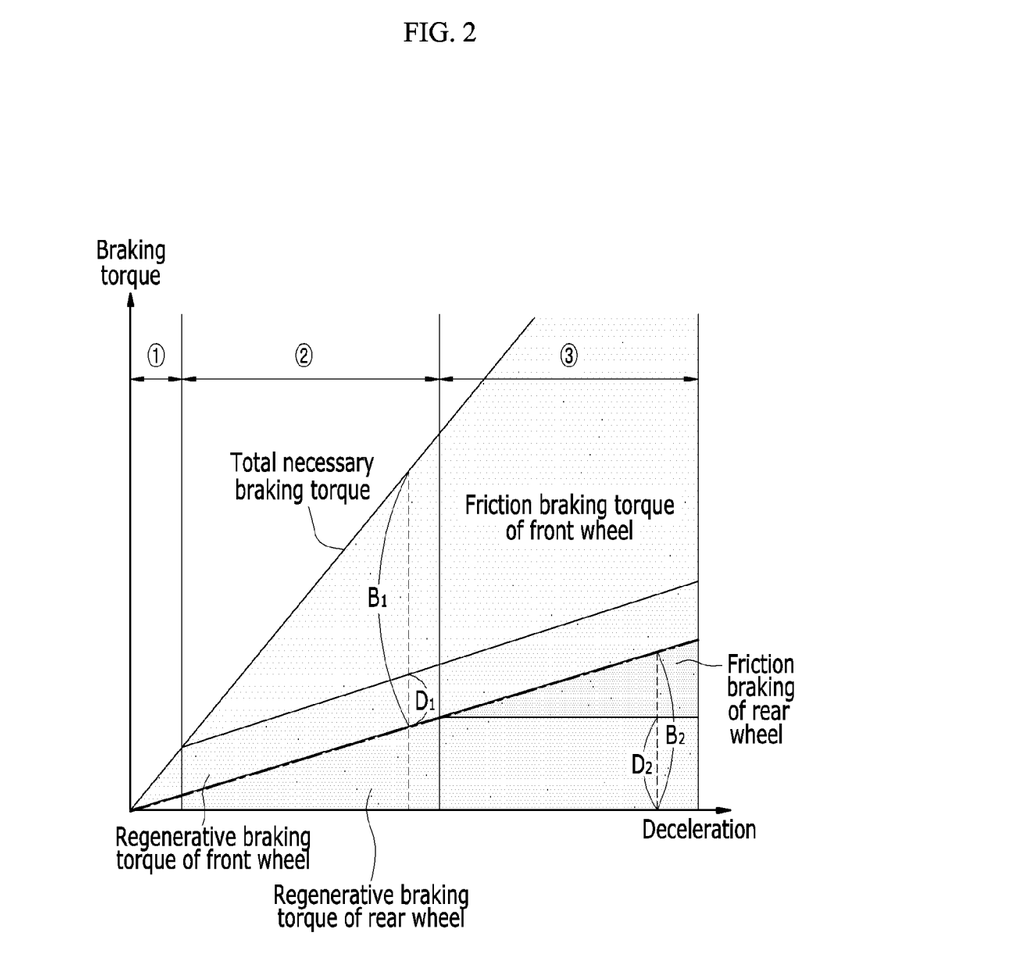
FIG. 2 is a graph showing the relationship between deceleration and braking torque.

FIG. 2 is a graph showing the relationship between deceleration and braking torque.

As shown in FIG. 2, in early braking of the vehicle, the controller distributes necessary braking torque to the front wheels and the rear wheels (see section (1) in FIG. 2). In this process, the necessary braking torque to be distributed to the front wheels is set to be larger than the necessary braking torque to be distributed to the rear wheels in order to secure stability during braking of the vehicle.

The controller causes friction braking torque to be generated at the front wheels, when the necessary braking torque B1 of the front wheels is larger than regenerative braking torque D1 of the front wheels during braking of the vehicle (see section (2) in FIG. 2). Generating friction braking torque at the front wheels means generating braking torque at the front wheels, using a common brake system.

The regenerative braking torque at the front wheels may be set to the smaller one of values obtained by subtracting a value which is obtained by multiplying the friction torque of the engine by the gear ratio of the current shift gear (i.e., the current gear ratio of the vehicle transmission) from the necessary braking torque B1 of the front wheels, and the regenerative braking torque C available at the front wheels.

The regenerative braking torque at the front wheels is expressed as in Equation 1.

Regenerative braking torque at the front wheels C=Min (necessary braking torque at the front wheels, regenerative braking torque available at the front wheels−(engine friction torque*current gear ratio of the transmission)). [Equation 11]

The regenerative braking torque available at the front wheels may be set to the smaller one of a first regenerative braking torque available through the battery and a first regenerative braking torque available through the HSG.

The first regenerative braking torque available through the battery determines the regenerative braking torque through the HSG in consideration of the state of the battery system. The first regenerative braking torque available through the battery can be calculated from the following Equation 2.

First regenerative braking torque available=((chargeable power of the battery+power consumed by an auxiliary load−charging power of the motor)/charging efficiency of the battery)/speed of the front wheels. [Equation 2]

The power consumed by an auxiliary load means a load consumed by an air-conditioning system or an audio system, for example, in the vehicle. The regenerative braking torque through the HSG is determined in consideration of the charging power of the HSG.

The first regenerative braking torque available through the HSG can be calculated by obtaining the speed and the torque at the front wheels from a speed-torque curve of the HSG (NT curve (here, N denotes motor speed and T denotes motor torque)) corresponding to the gears of the transmission and then multiplying the torque at the front wheels by a state variable.

In other words, the speed and the torque at the front wheels are calculated from the NT curve of the HSG. That is, if the speed and the torque through the HSG are known, the speed and the torque at the front wheels connected with the HSG can be calculated. The first regenerative braking torque available through the HSG can be calculated by multiplying the torque at the front wheels by the state variable.

The state variable, which is a variable considering the state of the HSG system, has a value between 0 and 1. When there is a problem with the system such as overheating of the HSG, the state variable has a value close to 0.

It is possible to calculate friction braking torque to be generated on the front wheels by subtracting the regenerative braking torque at the front wheels from the necessary braking torque at the front wheels.

The controller causes friction braking torque to be generated at the rear wheels when necessary braking torque B2 at the rear wheels is larger than regenerative braking torque D2 at the rear wheels (see section (3) in FIG. 2).

The regenerative braking torque D2 at the rear wheels may be set to the smaller one of a second regenerative braking torque available through the battery and a second regenerative braking torque available through the motor.

The second regenerative braking torque available through the battery determines the regenerative braking torque through the motor in consideration of the state of the battery system. The second regenerative braking torque available through the battery can be calculated from the following Equation 3.

Second regenerative braking torque available= ((chargeable power of the battery+power consumed by an auxiliary load)/charging efficiency of the battery)/speed of the rear wheels. [Equation 3]

The power consumed by an auxiliary load determines regenerative braking torque through the motor in consideration of a load consumed by an air-conditioning system or an audio system, for example, in the vehicle.

The second regenerative braking torque available through the motor can be calculated by obtaining the speed and the torque at the rear wheels from a speed-torque curve of the motor (NT curve) and then multiplying the torque at the rear wheels by a state variable.

In other words, the speed and the torque at the rear wheels are calculated from the NT curve of the motor. In particular, if the speed and the torque through the motor are known, the speed and the torque at the rear wheels connected with the motor can be calculated. The second regenerative braking torque available through the motor can be calculated by multiplying the torque at the rear wheels by the state variable.

The state variable, which is a variable considering the state of the motor system, has a value between 0 and 1. When there is a problem with the system such as overheating of the motor, the state variable has a value close to 0.

It is possible to calculate friction braking torque to be generated at the rear wheels by subtracting the regenerative braking torque at the rear wheels from the necessary braking torque at the rear wheels.

The controller causes the engine clutch to be disengaged when the engine speed is lower than a predetermined speed (e.g., during a braking operation). When the engine speed is lower than the predetermined speed, it may overlap the resonance frequency of the engine. Accordingly, resonance is prevented by disengaging the engine clutch.

Hereinafter, a regenerative braking method according to an exemplary embodiment of the present invention is described in detail.

The controller may be implemented by one or more processors operated by a predetermined program, in which the predetermined program is set to perform steps of a regenerative braking method of a hybrid vehicle according to an exemplary embodiment of the present invention.

Figure 3:
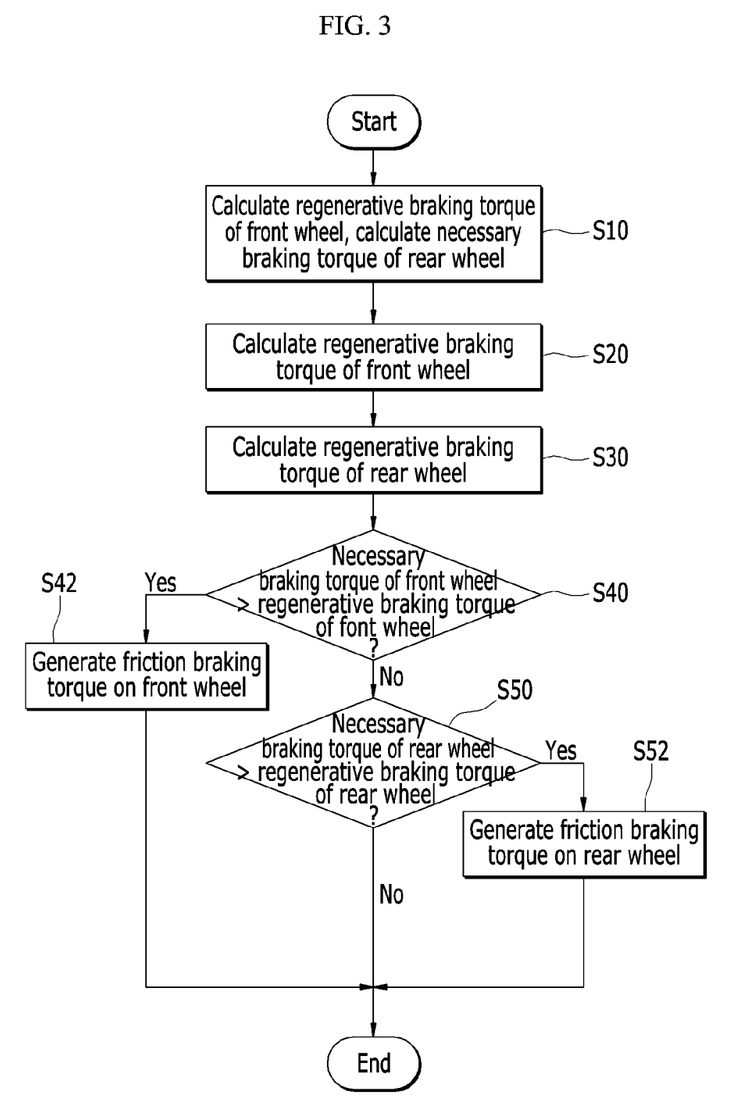
FIG. 3 is a flowchart illustrating a regenerative braking method of a hybrid vehicle according to an exemplary embodiment of the present invention.

FIG. 3 is a flowchart illustrating a regenerative braking method of the hybrid vehicle according to an exemplary embodiment of the present invention.

As shown in FIG. 3, the controller causes braking torque to be distributed to front wheels and rear wheels on the basis of total necessary braking torque determined in response to a braking signal of the vehicle. Necessary braking torque at the front wheels and necessary braking torque at the rear wheels are calculated from the distributed braking torque (S10).

The controller calculates regenerative braking torque at the front wheels and braking torque at the rear wheels (S20).

When the necessary braking torque at the front wheels is larger than the regenerative braking torque at the front wheels (S40), the controller causes friction braking torque to be generated at the front wheels (S42), and when the necessary braking torque at the rear wheels is larger than the regenerative braking torque at the rear wheels (S50), the controller causes friction braking torque to be generated at the rear wheels (S52).

Next, a method of calculating the regenerative braking torque at the front wheels is described in detail.

Figure 4:
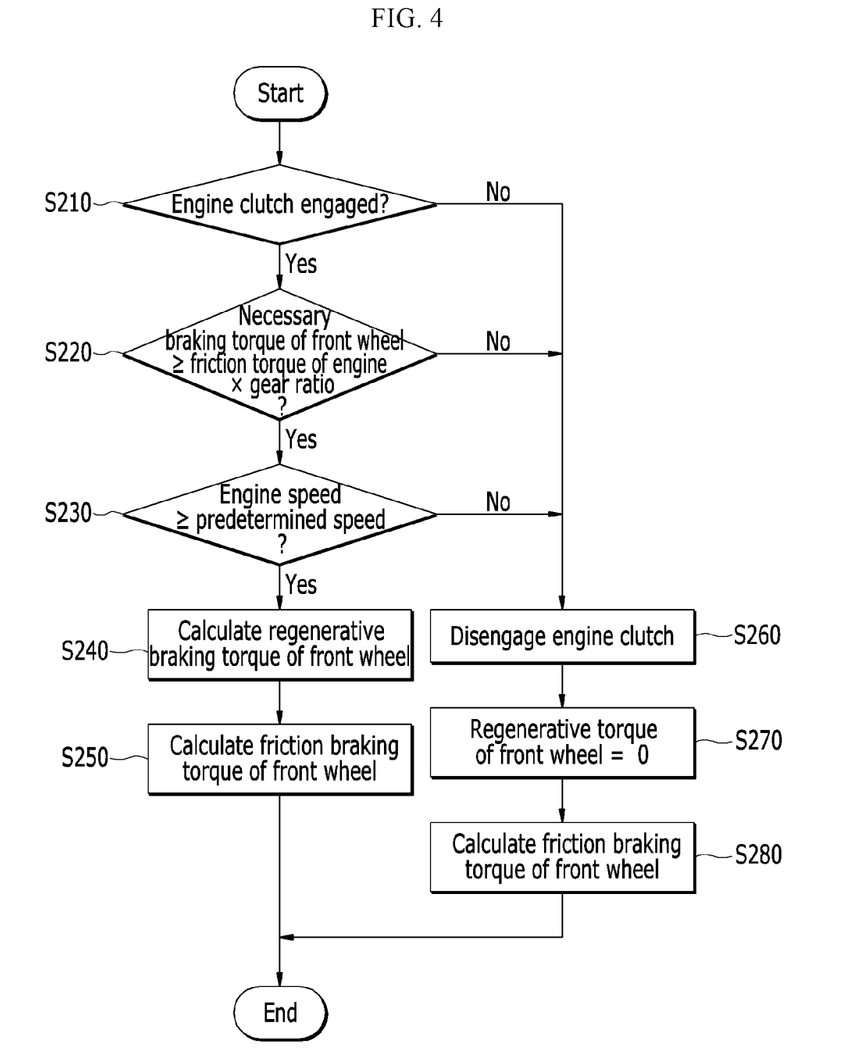
FIG. 4 is a flowchart illustrating a method of calculating braking torque of front wheels according to an exemplary embodiment of the present invention.

FIG. 4 is a flowchart illustrating a method of calculating braking torque at the front wheels according to an exemplary embodiment of the present invention. As shown in FIG. 4, the controller determines whether the engine clutch has been engaged (S210).

The controller compares the necessary braking torque at the front wheels with the friction torque of the engine (S220). When the necessary braking torque at the front wheels is smaller than the friction torque of the engine, with the engine clutch engaged, the friction torque of the engine is used as braking torque, so there is no need for performing regenerative braking through the HSG.

The controller determines whether the speed of the engine is higher than a predetermined speed (S230). When the speed of the engine is lower than the predetermined speed, it may overlap the resonance frequency of the engine. Accordingly, resonance is prevented by disengaging the engine clutch.

The controller calculates the regenerative braking torque at the front wheels when the engine clutch is engaged, the necessary braking torque at the front wheels is over the friction torque of the engine, and the speed of the engine is over a predetermined speed (S240).

The controller calculates the friction braking torque at the front wheels (S250).

The methods of calculating the regenerative braking torque at the front wheels and the friction braking torque at the front wheels are the same as those described above, so the detailed description is not provided.

When the engine clutch has been disengaged in step S260, the controller keeps the engine clutch disengaged (S260). When the necessary braking torque at the front wheels is smaller than the friction torque of the engine in step S220, the engine clutch is disengaged (S260). When the engine speed is lower than a predetermined speed in step S230, the engine clutch is disengaged (S260).

The controller sets the regenerative braking torque at the front wheels to zero (S270). In particular, regenerative braking through the HSG is not performed.

The controller calculates the friction braking torque at the front wheels (S280). In particular, since the regenerative braking torque at the front wheels is zero, the friction braking torque at the front wheels becomes the necessary braking torque at the front wheels.

Next, a method of calculating the regenerative braking torque at the rear wheels is described in detail.

Figure 5:
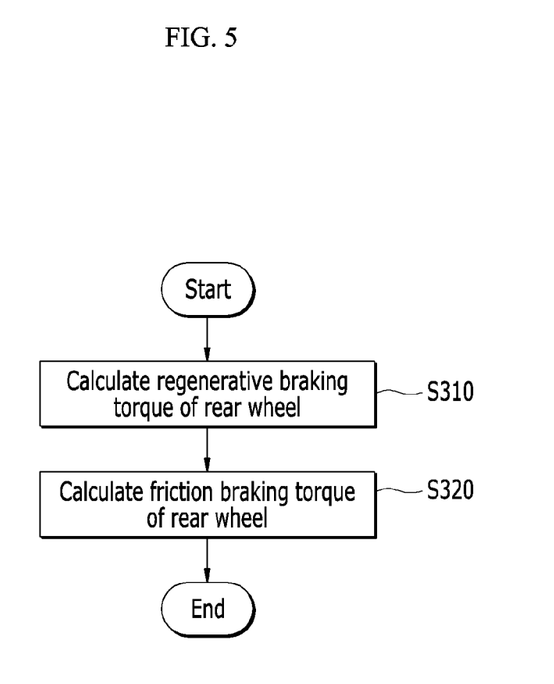
FIG. 5 is a flowchart illustrating a method of calculating braking torque of rear wheels according to an exemplary embodiment of the present invention.

FIG. 5 is a flowchart illustrating a method of calculating braking torque of rear wheels according to an exemplary embodiment of the present invention.

As shown in FIG. 5, the controller calculates the regenerative braking torque at the rear wheels (S310).

The controller calculates the friction braking torque at the rear wheels (S320).

The methods of calculating the regenerative braking torque at the rear wheels and the friction braking torque at the rear wheels are the same as those described above, so the detailed description is not provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A regenerative braking apparatus of a vehicle, comprising:
    an engine that supplies power to front wheels of the vehicle;
    a hybrid starting generator (HSG) that starts the engine and generates electrical energy by operating as a power generator with the engine in operation;
    an engine clutch that is disposed between the engine and a transmission and selectively transmits the power from the engine to the front wheels;
    a motor that supplies power to rear wheels of the vehicle and generates electrical energy by operating as a power generator during braking of the vehicle;
    a battery that stores the electrical energy generated by the HSG and the motor; and
    a controller that causes a friction braking torque to be generated at the front wheels when a necessary braking torque at the front wheels is larger than a regenerative braking torque at the front wheels, and that causes a friction braking torque to be generated at the rear wheels when a necessary braking torque at the rear wheels is larger than a regenerative braking torque at the rear wheels, during braking of the vehicle, wherein
    the regenerative braking torque at the front wheels is set to the smaller one of: a) the necessary braking torque at the front wheels and b) a regenerative braking torque available at the front wheels−(a friction torque*a current gear ratio of the transmission), and
    the regenerative braking torque at the rear wheels is set to the smaller one of: a) a second regenerative braking torque available through the battery and b) a second regenerative braking torque available through the motor.

2. The apparatus of claim 1, wherein the regenerative braking torque available at the front wheels is set to the smaller one of: a) a first regenerative braking torque available through the battery and b) a first regenerative braking torque available through the HSG.

3. The apparatus of claim 2, wherein the first regenerative braking torque available through the battery is calculated according to the following equation: the first regenerative braking torque available through the battery=((chargeable power of the battery+power consumed by an auxiliary load−charging power of the motor)/charging efficiency of the battery)/speed of the front wheels.

4. The apparatus of claim 2, wherein the first regenerative braking torque available through the HSG is calculated by: determining a torque of the HSG that corresponds to a speed of the HSG according to a speed-torque curve of the HSG, determining a torque being applied at the front wheels corresponding to the current gear ratio of the transmission based on the torque of the HSG, and then multiplying the torque being applied at the front wheels by a state variable, which results in the first regenerative braking torque available through the HSG.

5. The apparatus of claim 1, wherein the second regenerative braking torque available through the battery is calculated according to the following equation: the second regenerative braking torque available through the battery=((chargeable power of the battery+power consumed by an auxiliary load)/charging efficiency of the battery)/speed of the rear wheels.

6. The apparatus of claim 1, wherein the second regenerative braking torque available through the motor is calculated by: determining a torque of the motor that corresponds to a speed of the motor according to a speed-torque curve of the motor, determining a torque being applied at the rear wheels based on the torque of the motor, and then multiplying the torque being applied at the rear wheels by a state variable, which results in the second regenerative braking torque available through the motor.

7. The apparatus of claim 1, wherein the controller disengages the engine clutch when an engine speed is lower than a predetermined speed.

8. A regenerative braking method of a vehicle, comprising:
calculating a necessary braking torque at front wheels of the vehicle and a necessary braking torque at rear wheels of the vehicle based on a total necessary braking torque determined in response to a braking signal of the vehicle;
calculating a regenerative braking torque at the front wheels and a regenerative braking torque at the rear wheels;
generating a friction braking torque at the front wheels when the necessary braking torque at the front wheels is larger than the regenerative braking torque at the front wheels; and
generating a friction braking torque at the rear wheels when the necessary braking torque at the rear wheels is larger than the regenerative braking torque at the rear wheels, wherein
the regenerative braking torque at the front wheels is set to the smaller one of: a) the necessary braking torque at the front wheels and b) a regenerative braking torque available at the front wheels−(a friction torque*a current gear ratio of the transmission), and
the regenerative braking torque at the rear wheels is set to the smaller one of: a) a second regenerative braking torque available through the battery and b) a second regenerative braking torque available through the motor.

9. The method of claim 8, wherein the calculating of the regenerative braking torque at the front wheels includes:
determining whether an engine clutch has been engaged;
comparing the necessary braking torque at the front wheels with a friction torque of an engine of the vehicle;
determining whether a speed of the engine is higher than a predetermined speed; and
calculating the regenerative braking torque at the front wheels when the engine clutch is engaged, the necessary braking torque at the front wheels is larger than the friction torque of the engine, and the speed of the engine is larger than the predetermined speed.

10. The method of claim 9, wherein the regenerative braking torque available at the front wheels is set to the smaller one of: a) a first regenerative braking torque available through a battery of the vehicle and b) a first regenerative braking torque available through an HSG of the vehicle.

11. The method of claim 10, wherein the first regenerative braking torque available through the battery is calculated according to the following equation: the first regenerative braking torque available through the battery=((chargeable power of the battery+power consumed by an auxiliary load−charging power of a motor of the vehicle)/charging efficiency of the battery)/speed of the front wheels.

12. The method of claim 10, wherein the first regenerative braking torque available through the HSG is calculated by: determining a torque of the HSG that corresponds to a speed of the HSG according to a speed-torque curve of the HSG, determining a torque being applied at the front wheels corresponding to the current gear ratio of the transmission based on the torque of the HSG, and then multiplying the torque being applied at the front wheels by a state variable, which results in the first regenerative braking torque available through the HSG.

13. The method of claim 8, wherein the second regenerative braking torque available through the battery is calculated according to the following equation: the second regenerative braking torque available through the battery=((chargeable power of the battery+power consumed by an auxiliary load)/charging efficiency of the battery)/speed of the rear wheels.

14. The method of claim 8, wherein the second regenerative braking torque available through the motor is calculated by: determining a torque of the motor that corresponds to a speed of the motor according to a speed-torque curve of the motor, determining a torque being applied at the rear wheels based on the torque of the motor, and then multiplying the torque being applied at the rear wheels by a state variable, which results in the second regenerative torque available through the motor.

* * * * *